(12) United States Patent
Prodic et al.

(10) Patent No.: US 8,274,264 B2
(45) Date of Patent: Sep. 25, 2012

(54) DIGITAL CONTROL METHOD FOR IMPROVING HEAVY-TO-LIGHT (STEP DOWN) LOAD TRANSIENT RESPONSE OF SWITCH MODE POWER SUPPLIES

(75) Inventors: Aleksandar Prodic, Toronto (CA); Zhenyu Zhao, Burlington (CA)

(73) Assignee: Exar Corporation, Fremont, CA (US)

( * ) Notice: Subject to any disclaimer, the term of this patent is extended or adjusted under 35 U.S.C. 154(b) by 241 days.

(21) Appl. No.: 12/708,871

(22) Filed: Feb. 19, 2010

(65) Prior Publication Data

US 2011/0204862 A1    Aug. 25, 2011

(51) Int. Cl.
*G05F 1/00* (2006.01)
(52) U.S. Cl. .................... 323/222; 323/271; 323/282
(58) Field of Classification Search .............. 323/222, 323/223, 271, 282, 284, 311, 349, 350, 351
See application file for complete search history.

(56) References Cited

U.S. PATENT DOCUMENTS

| | | | | |
|---|---|---|---|---|
| 6,834,001 | B2 * | 12/2004 | Myono | 363/60 |
| 7,907,429 | B2 * | 3/2011 | Ramadass et al. | 363/59 |
| 2004/0184289 | A1 | 9/2004 | Vinciarelli | |
| 2004/0245972 | A1 * | 12/2004 | Vire et al. | 323/282 |
| 2005/0264271 | A1 * | 12/2005 | Lam et al. | 323/282 |
| 2006/0120122 | A1 | 6/2006 | Lipcsei | |
| 2006/0220938 | A1 | 10/2006 | Leung et al. | |
| 2007/0247124 | A1 | 10/2007 | Mihashi | |
| 2008/0252280 | A1 | 10/2008 | Prodic et al. | |
| 2009/0059630 | A1 | 3/2009 | Williams | |
| 2009/0278520 | A1 * | 11/2009 | Perreault et al. | 323/282 |

OTHER PUBLICATIONS

International Searching Authority, "International Search Report and Written Opinion", May 12, 2011, 8 pages.

* cited by examiner

*Primary Examiner* — Nguyen Tran
(74) *Attorney, Agent, or Firm* — Fliesler Meyer LLP

(57) ABSTRACT

A method for improving heavy-to-light load transient response in low-power switch-mode power supplies is described. It uses a negative voltage input power rail and a digital controller with an extended duty ratio control value to provide faster discharging current slew rate in the switched mode power supplies (SMPS) inductor.

14 Claims, 8 Drawing Sheets

US 8,274,264 B2

DIGITAL CONTROL METHOD FOR IMPROVING HEAVY-TO-LIGHT (STEP DOWN) LOAD TRANSIENT RESPONSE OF SWITCH MODE POWER SUPPLIES

FIELD OF THE INVENTION

The present invention relates to DC-DC converters, such as switched mode power supplies (SMPS).

BACKGROUND OF THE INVENTION

DC-DC converters are used to convert an input DC voltage to an output DC voltage. A pulse width modulation (PWM) signal is used to create a DC output in the DC-DC converter. The duty cycle (percentage of time high) of the PWM signal determines the DC output voltage in steady state of the converter The PWM signal is sent to power switches that send an input voltage into an LC circuit, which includes an inductor and an output capacitor, to produce the output voltage. The output voltage is used to create a feedback signal. The feedback signal is used to adjust the PWM signal so as to keep the output voltage at the desired DC output voltage value.

The maximum load transient response speed in DC-DC converter is limited by the values of the power stage's inductor and capacitor, as well as with the values of input and output voltages. In modern DC-DC converters with a significant step-down ratio, these limitations make heavy-to-light load transient response significantly slower than the response to the opposite transients causing significant voltage overshoot and/or requiring larger output capacitors.

In a light-to-heavy load transient response, the DC output voltage dips and the duty cycle can be increased up to 1 (from its normal relatively low value) to quickly adjust the DC output voltage. On the other hand, in a heavy-to-light transient response, the DC output voltage spikes and the duty cycle can only be dropped to zero (from its normal relatively low value). Since zero is close to the normal relatively low duty cycle value, the system will take longer to respond to the heavy-to-light transient response. To minimize this problem, in most topology-based methods, filter inductance is altered or bridged during transient to result in a higher current slew rate than in steady state.

SUMMARY OF THE INVENTION

A DC-DC power supply and controller is described that allows for a negative input voltage to be used to allow the DC-DC controller to quickly respond to heavy-to-light load transients. The controller generates switching signals to provide a positive input voltage and ground to the converter during normal operation and a negative input voltage and ground during the heavy-to-light transient response. The controller can use negative duty cycle values during the heavy-to-light transient response to indicate the portion of a cycle that the negative input voltage is to be used. A capacitor can be used to produce the negative input voltage. The improved DC-DC controller has a better response to heavy-to-light load transients.

DETAILED DESCRIPTION

Figure 1:
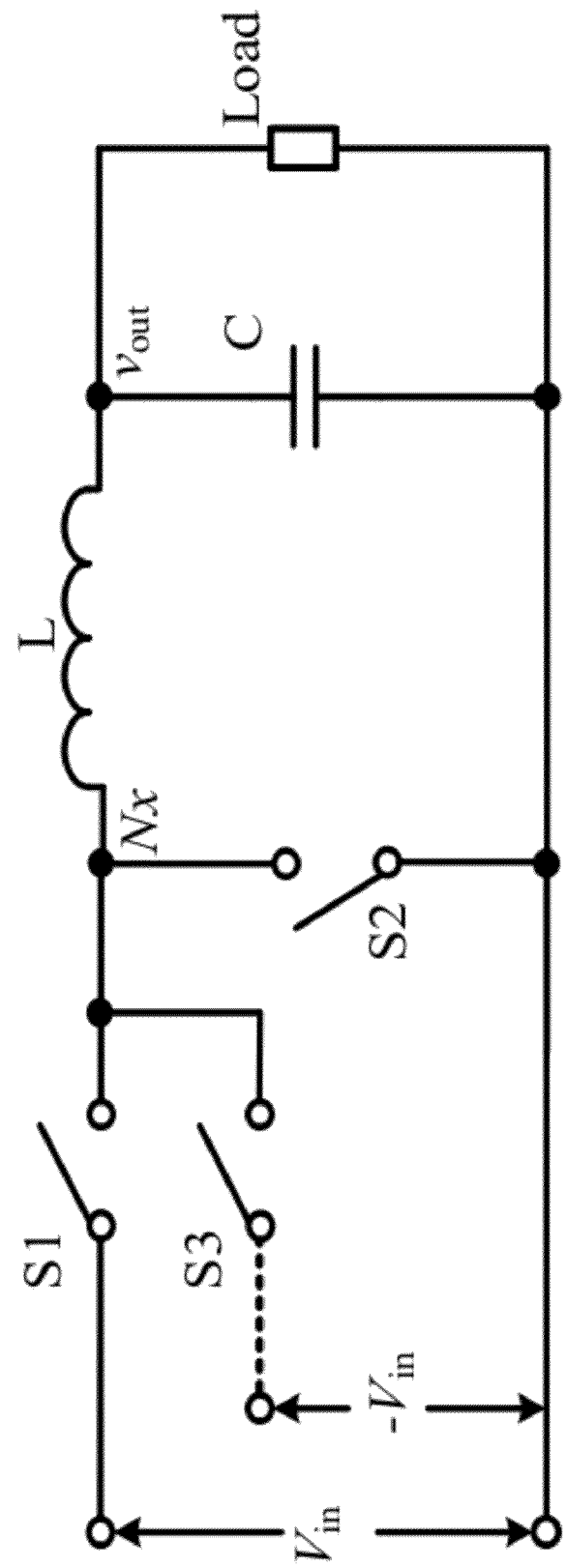
FIG. 1 is a conceptual block diagram of a 3-level buck converter of one embodiment of the present invention.

A DC-DC power supply 300 produces a DC output voltage, $V_{out}(t)$. A controller 302 produces switching signals $c_1(t) \ldots c_5(t)$ during a heavy-to-light load transient response, such that a negative input voltage is used by the DC-DC power supply.

The negative input voltage is switched into an external LC circuitry 202 (including inductor 206 and capacitor 204) of the DC-DC power supply to quickly adjust the DC output to the heavy-to-light load transient.

Figure 2:
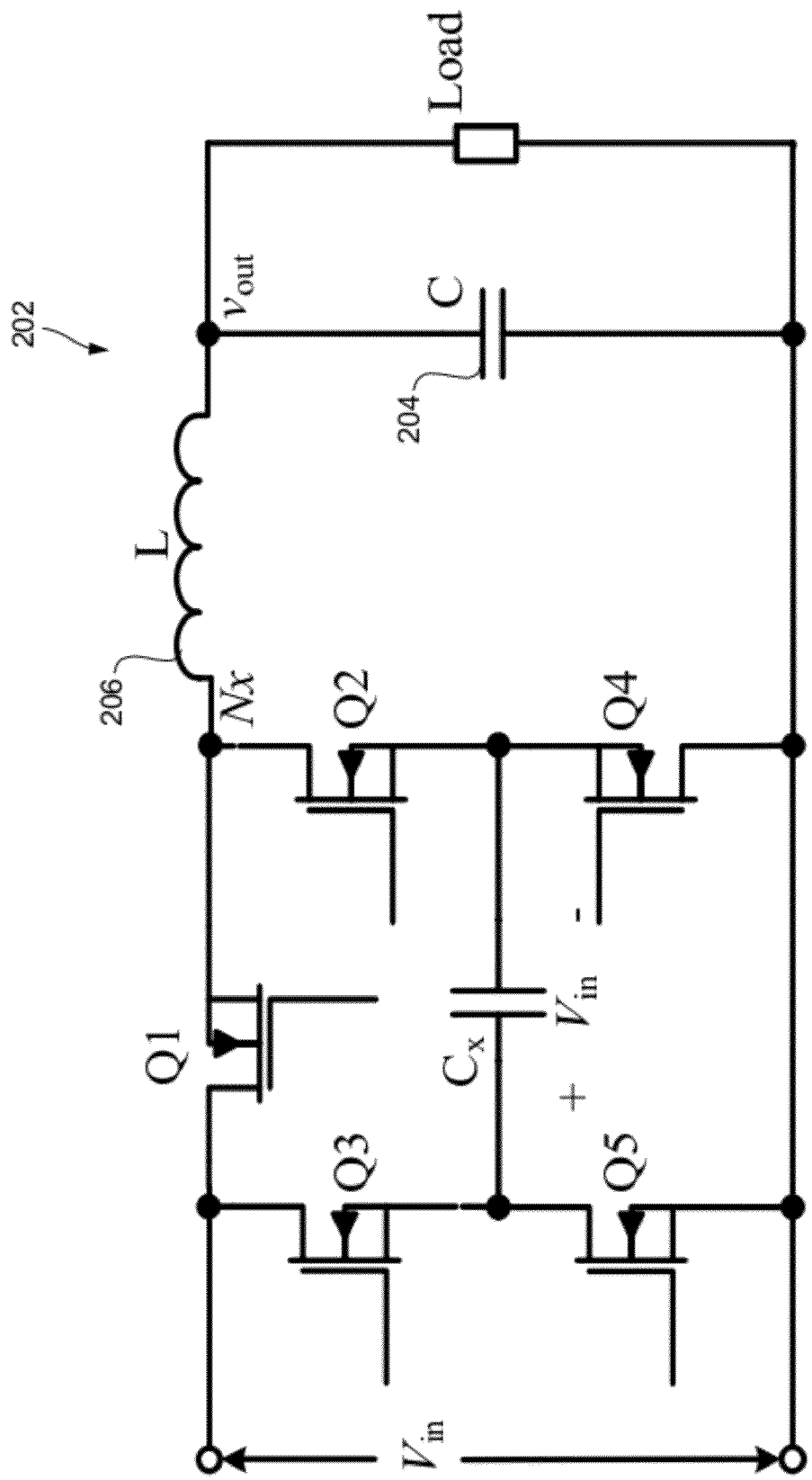
FIG. 2 is an exemplary practical implementation of the 3-level buck converter presented in FIG. 1.

The switching signals $c_1(t) \ldots c_5(t)$ are sent to power switches (such as switches $Q_1 \ldots Q_5$) of FIG. 2, to switch in a positive input voltage and ground during normal operation and the negative input voltage and ground during the heavy-to-light load transient response.

The switching signals can be used so as to charge a capacitor $C_x$ to provide the negative voltage.

The switching signals $c_1(t) \ldots c_5(t)$ are used to control switches $Q_1 \ldots Q_5$ to provide the input voltage, ground and negative voltage into an external LC circuit 202. The controller 302 uses a duty cycle d[n] that can go negative. Positive duty cycle values indicating the portion of a cycle that a positive input voltage is provided rather than ground and negative duty cycle values indicating the portion of a cycle that a negative input voltage is provided rather than ground.

The maximum load transient response speed in SMPS is limited by the values of the power stage's inductor and capacitor, as well as the values of input and output voltages. In modern DC-DC converters with a significant step-down ratio, these limitations make heavy-to-light load transient response significantly slower than the response to the opposite transients causing significant voltage overshoot and/or requiring larger output capacitors. To minimize this problem, in most topology-based methods, filter inductance is altered or bridged during transient to result in a higher current slew rate than in steady state.

Theoretically, for a given converter, a linear compensator can be designed to achieve arbitrarily high control bandwidth. However, in reality, the achievable bandwidth is limited by the applicable duty ratio range, which is from 0 to 1 in a buck converter. Once the duty ratio saturates, the speed of transient response depends solely on the slew rate of the inductor current.

In a conventional buck converter with a relatively large step down ratio, i.e. $V_{in}$ significantly larger than $2V_{out}$, inductor current slew rates during step-up and step-down load changes have considerably different values. During a heavy-to-light load transient the current slew rate is limited by $(V_{in}-V_{out})/L$, while during the opposite load change the rate is $-V_{out}/L$, where L is the inductance value. Because of the much smaller rate, the converter needs more time to suppress heavy-to-light load transients. In modern DC-DC converters supplying electronic devices this problem becomes evident, as the trend of reducing the output voltage, i.e. increasing step down ratio, of converters to a sub 1 V range continues. Consequently, during step down load changes, the converter experience longer transients and larger overshoots.

As an alternative, a modified 3-level buck converter of FIG. 1 is used that increases the slew rate during heavy-to-light load transients. An implementation of the conventional 3-level 4-switch buck converter usually used in high power applications was proposed for envelope tracking in low-power high-bandwidth amplifiers. There the converter producing inputs of 0, $V_{in}/2$, and $V_{in}$ is used to minimize the output voltage ripple and increase efficiency.

In one embodiment, a 5-switch implementation of a 3-level buck of FIG. 2 is used to improve heavy-to-light load transient response. The input voltage of the converter in this case has three levels, $+V_{in}$, 0, and $-V_{in}$. The idea is that during heavy-to-light transients connect the inductor input node, $N_X$, is connected to the negative voltage rail, $-V_{in}$, instead of 0. In this way the absolute value of slew rate for heavy-to-light load transients is increased to $(V_{out}+V_{in})/L$. It should be noted that not all of the transistors added to this topology need to have high current ratings. In steady state $Q_1$ and $(Q_2+Q_4)$ operate as complementary switches and the converter behaves as a conventional buck. During heavy-to-light load transients only transistors $Q_3$ and $Q_5$ are active requiring much smaller average current compared to that of the other switches. The capacitor $C_x$, used to generate a negative $V_{in}$ at $N_X$ also serves as an input filtering capacitor during steady state operation.

A digital controller is used to switch seamlessly between the positive and the negative input voltage rails according to the sign of duty ratio control variable. The operation of the digital controller governing operation of the proposed converter can be illustrated with the block and timing diagrams of FIGS. 3 and 4, respectively.

The digital controller is quite simple and requires minor modification compared to that of a conventional voltage mode pulse-width modulated structures. The main difference is that in this implementation the duty ratio control variable d[n], produced by the PID compensator, is not limited between 0 and 1 but has an extended range of $-1<d[n]<1$. When the output voltage increases, due to a heavy-to-light load transient or some other disturbance, instead being limited to 0, d[n] can become negative. This negative value is automatically produced by the PID compensator 304.

Figure 4:
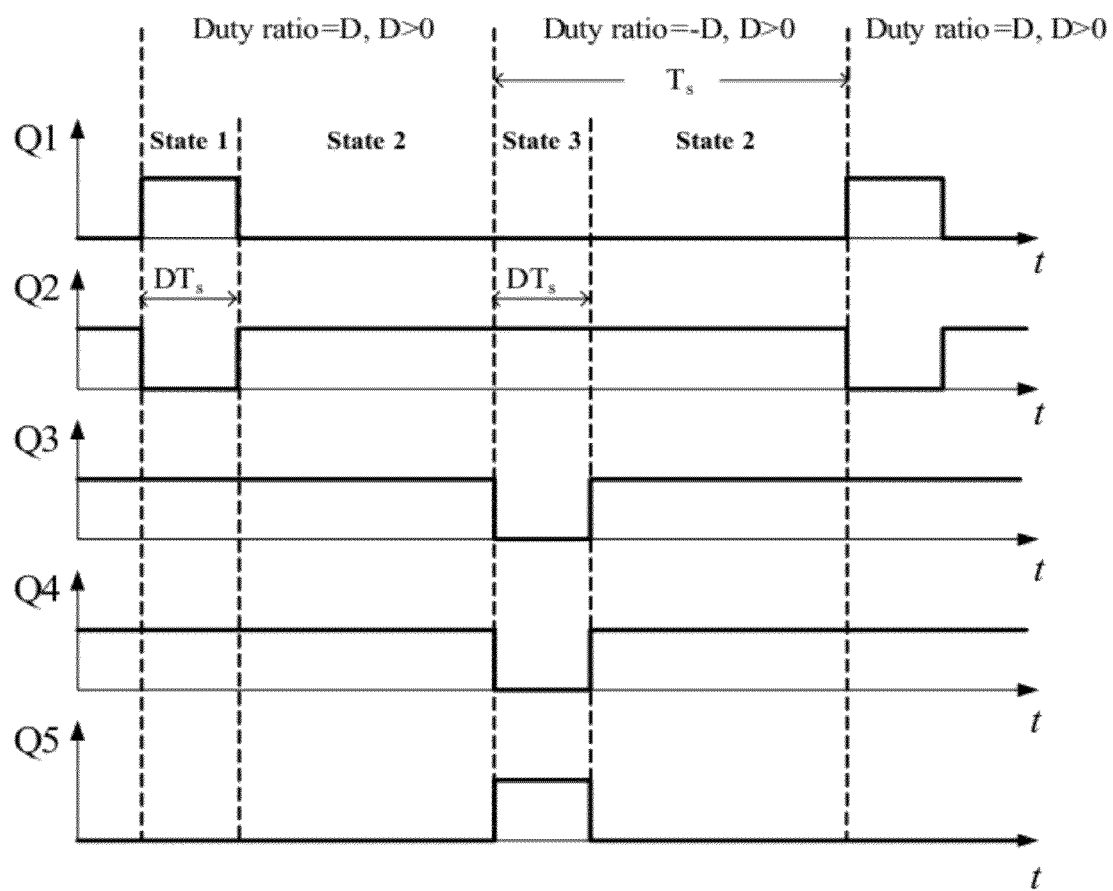
FIG. 4 is a timing diagram describing switching sequences of the proposed system.
Figure 5:
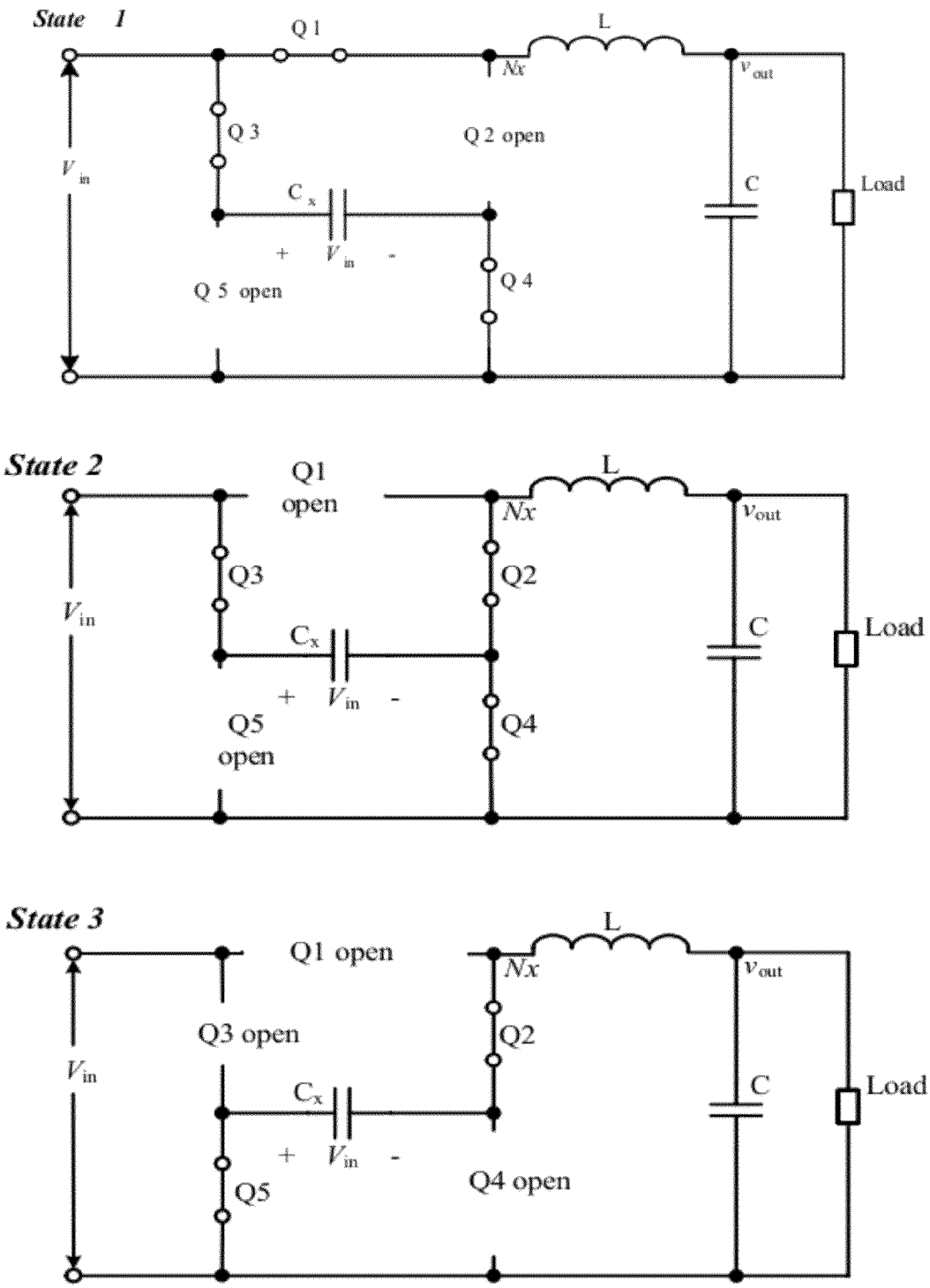
FIG. 5 illustrates modes of operation of a proposed 3-level buck converter.

Unlike in a conventional buck converter, where the negative value d[n] is discarded, due to the physical limitation of the topology, in this topology it used to initiate change of the converter configuration. The value of d[n] is always monitored by the Switching Sequence Logic 306 that selects the active transistors sequence based on the sign of duty ratio command. The operation of the logic is described by the timing diagram of FIG. 4 and corresponding circuit configuration diagrams of FIG. 5.

As we can see, when duty ratio control variable is positive, converter operates as a conventional buck switching between states 1 and 2 and disabling $Q_5$. In this case, $C_x$ behaves as an input filtering capacitor and is charged to the voltage V.

When a negative duty ratio command is created, the converter configuration of the state 2 is replaced by that of state 3 where the orientation of the capacitor $C_x$ is reversed by disconnecting $Q_3$, $Q_4$ and shorting $Q_5$ to impose a $-V_{in}$ voltage at $N_X$ node. In this way, an undisturbed feedback regulation is achieved. In this mode, sufficient non-overlapping times are necessary before the turn-on of $Q_5$ to prevent current shoot-through.

Compared to the response in the conventional case where duty ratio is limited at zero, the proposed method does not introduce nonlinearity due to the saturation action of the duty ratio control. Therefore, during the step-up and step-down transient, a balanced response can be achieved with an extended linear control operational range. Furthermore, the converter is able to produce an increased output voltage range from $-V_{in}$ to $V_{in}$.

Figure 3:
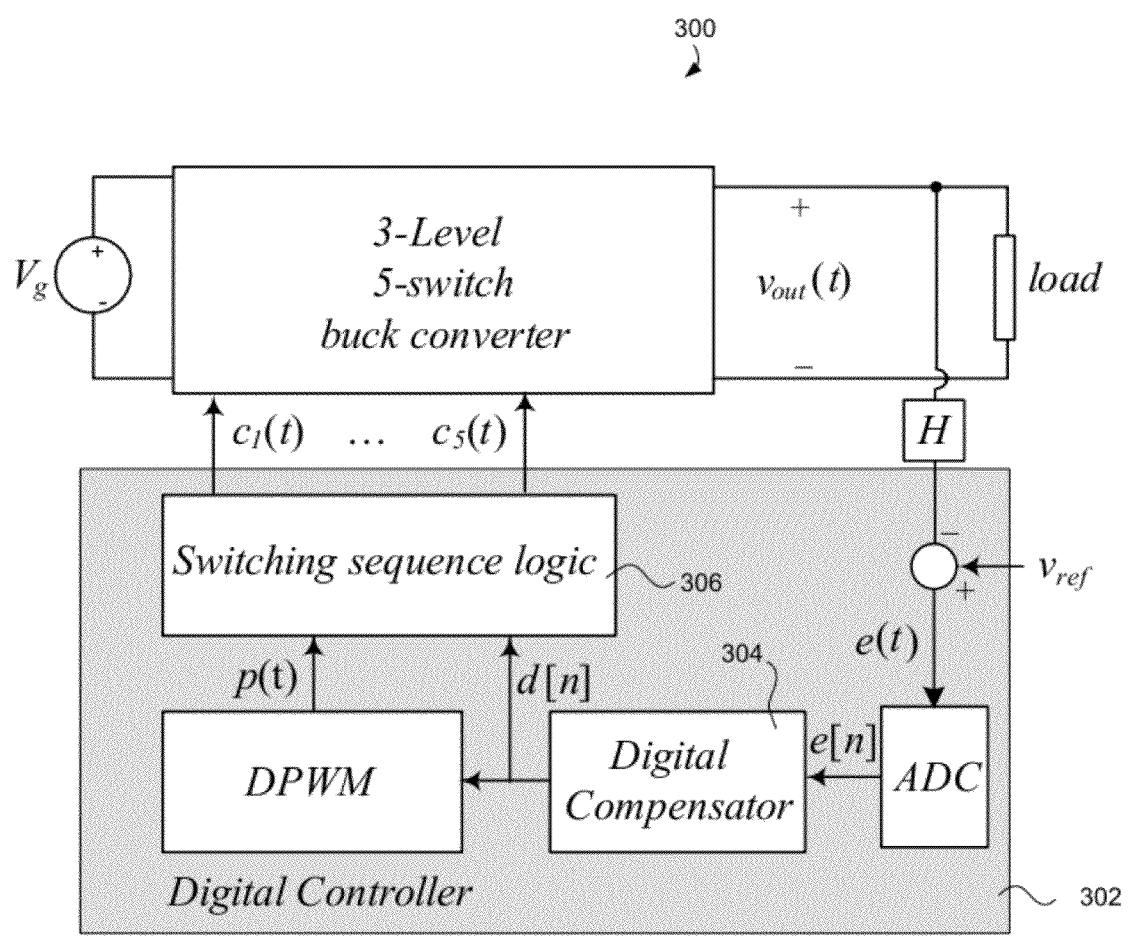
FIG. 3 is a block diagram of a digitally controlled 3-level buck converter.

An experimental setup realizing the system of FIGS. 2 and 3 was built and tested. The power stage is a three-level 6 V to 1.3 V, 400 kHz, 8 W. The converter parameters of this example are: inductor L=3.3 μH, output capacitor C=140 μF, switching frequency $f_{sw}$=400 KHz. To provide the negative input voltage a relatively small capacitor $C_x$=30 μF was used. The controller is implemented with an Altera DE2 FPGA board and an off-shelf ADC.

Figure 6:
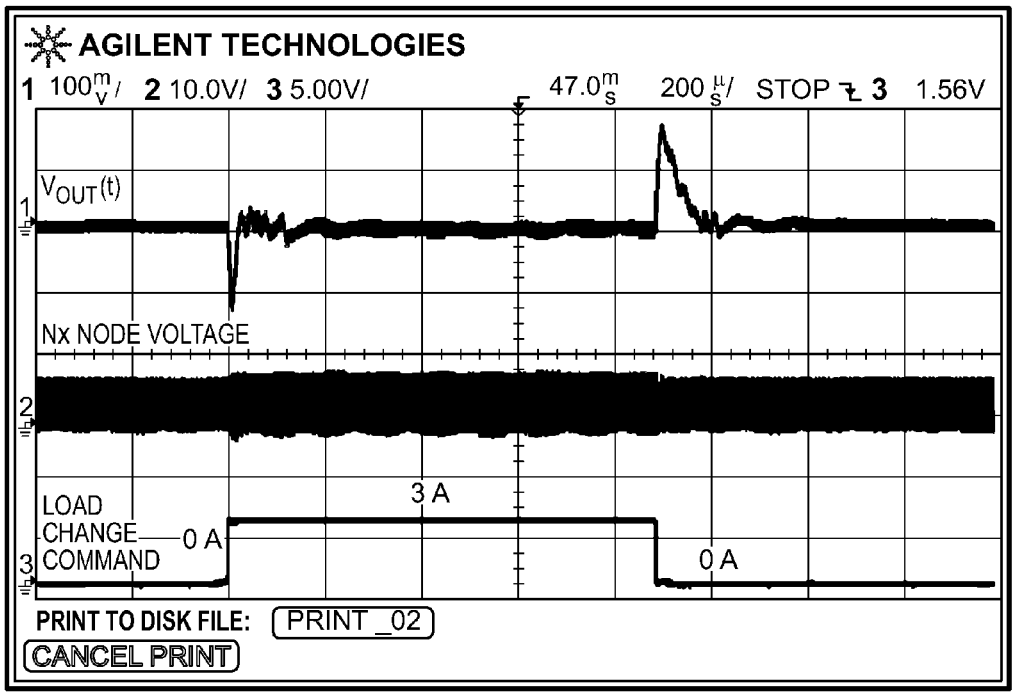
FIG. 6 illustrates asymmetric transient responses of a 6V-1.3V buck converter to a 3 A load change.

To demonstrate advantages of the proposed converter its response is compared with that of a conventional buck, for the step-down conversion ratio from 6 V to 1.3 V. In both cases the same compensator was used and the control bandwidth is set to be 1/10 of $f_{sw}$, i.e. 40 kHz. First, a conventional operation of a buck converter is realized by limiting the duty ratio command between (0, 1). It is shown in FIG. 6 that symmetric load changes between 0 A and 3 A causes asymmetric load transients. FIG. 6 illustrates asymmetric transient responses of a 6V-1.3V buck converter to a 3 A load change; channel 1 shows an output voltage (100 mV/div); channel 2 shows node Nx voltage (10V/div); channel 3 shows a load transient control signal; the time scale is 200 μs/div.

Figure 8:
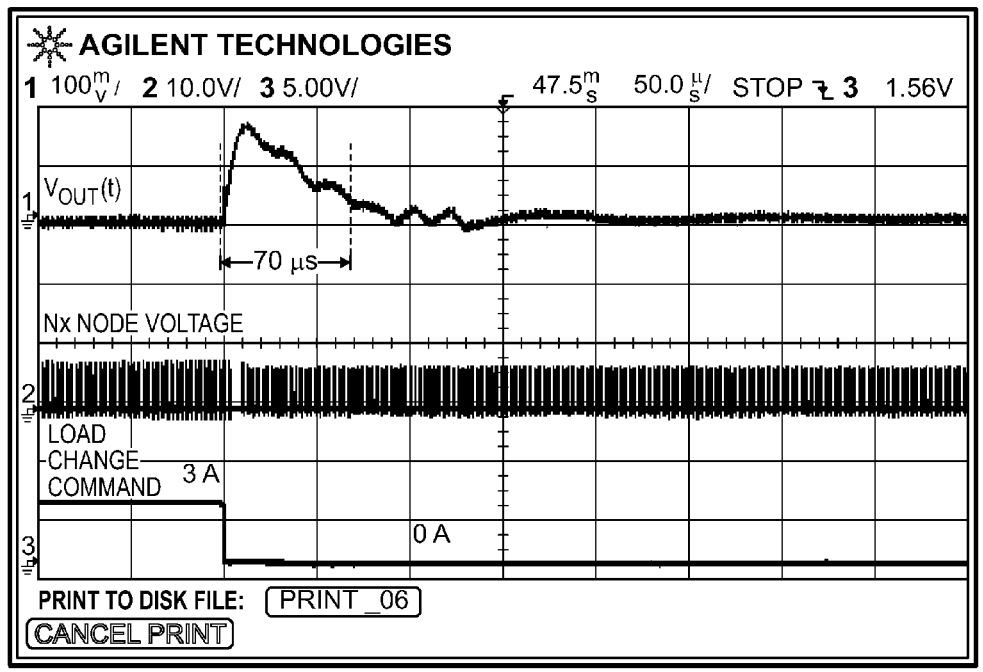
FIG. 8 illustrates an enlarged view of the 3 A to 0 A step-down transient with a settling time of 70 us and a voltage deviation of 170 mV.

The zoomed in view of the step-down transient shown in FIG. 8 has a 3 times longer settling time and 50 mV greater voltage deviation than those of step-up transient. This is due to the duty cycle saturation during load step-down, which can be seen in the $N_X$ node voltage waveform in FIG. 8. FIG. 8 illustrates an enlarged view of the 3 A to 0 A step-down transient with a settling time of 70 us and a voltage deviation of 170 mV; channel 1 shows an output voltage (100 mV/div); channel 2 shows a node Nx voltage (10V/div); channel 3 shows a load transient control signal; the time scale is 50 μs/div.

Figure 7:
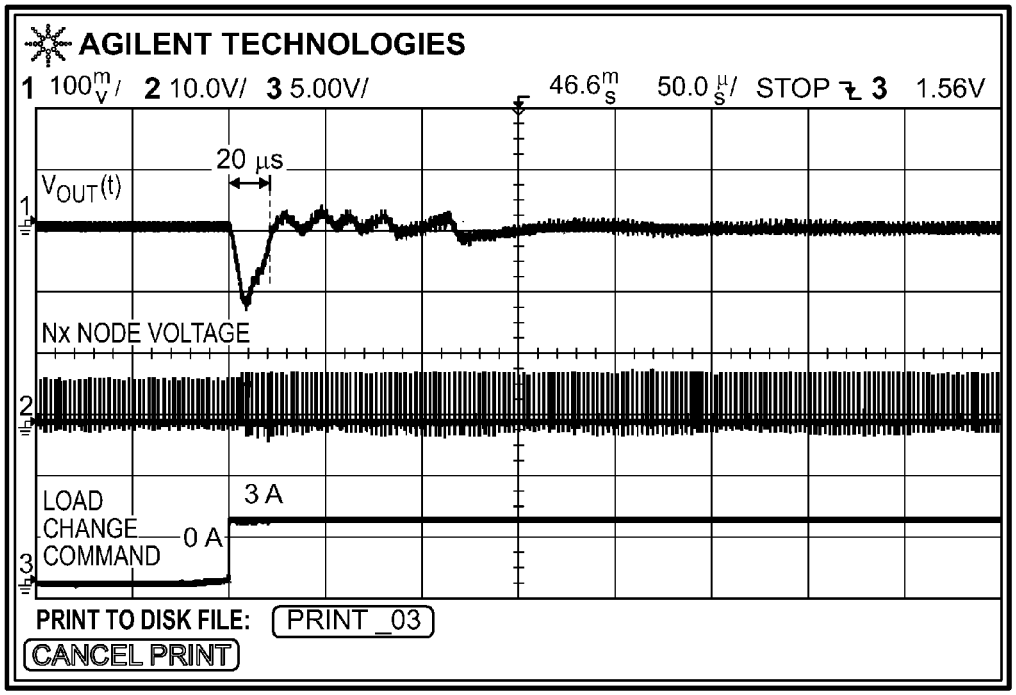
FIG. 7 shows an enlarged view of a 0 A to 3 A step-up transient with a settling time of 20 us and a voltage deviation of 120 mV.
Figure 9:
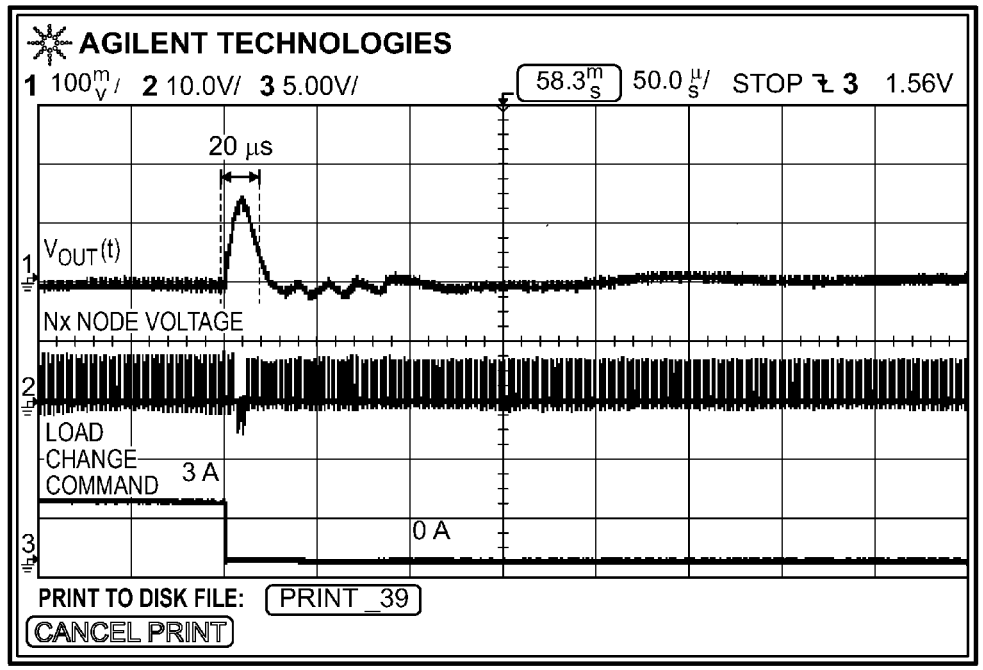
FIG. 9 illustrates an improved 3 A to 0 A step-down transient with a settling time of 20 us and a voltage deviation of 130 mV.

Next, the duty ratio limit is relaxed to (−1, 1) and the flying capacitor is in action. With the exact same test condition the step-down load transient shown in FIG. 9 is observed. FIG. 9 illustrates an improved 3 A to 0 A step-down transient with a settling time of 20 us and a voltage deviation of 130 mV; channel 1 shows an output voltage (100 mV/div); Channel 2 shows a Node Nx voltage (10V/div); channel 3 shows a load transient control signal; the time scale is 50 μs/div. Compared to that in FIG. 8, the proposed converter achieves a 3 times shorter settling time and a 40 mV smaller voltages overshoot. Compared to the step-up transient in FIG. 7 the improved step-down transient has approximately the same response, in other words, symmetrical response. FIG. 7 shows an enlarged view of a 0 A to 3 A step-up transient with a settling time of 20 us and a voltage deviation of 120 mV; channel 1 shows an output voltage (100 mV/div); channel 2 shows node Nx voltage (10V/div); channel 3 shows a load transient control signal; the time scale is 50 μs/div.

Figure 10:
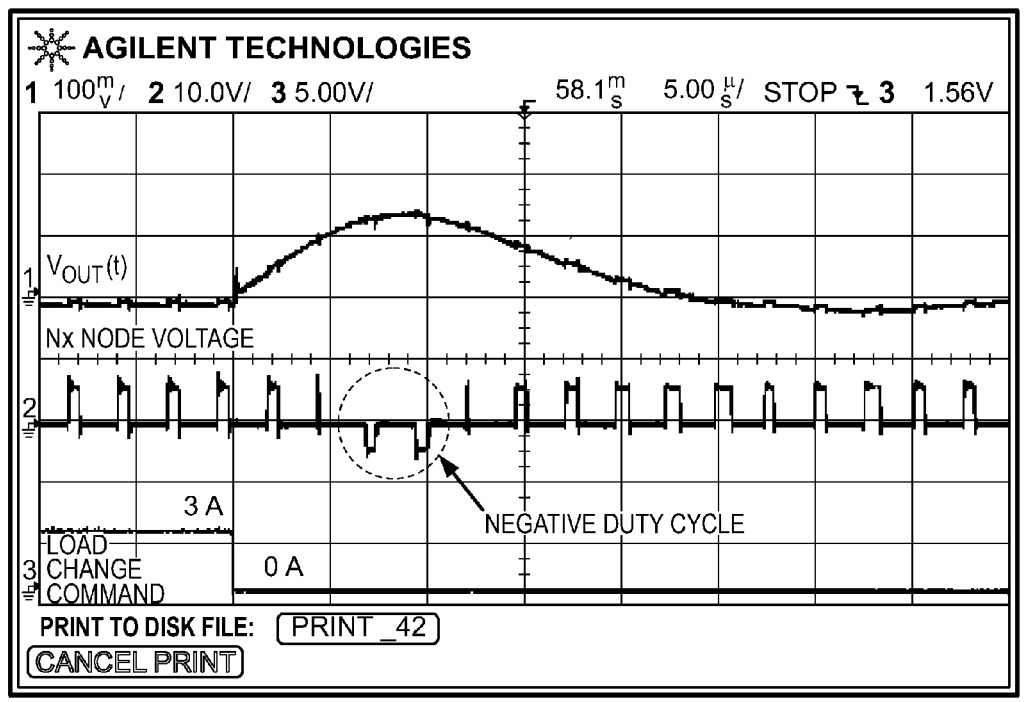
FIG. 10 illustrates a detailed view of the improved step-down transient with the negative Nx node voltage shown.

An enlarged view of the improved response is shown in FIG. 10 and a negative voltage at the $N_X$ node is observed when duty ratio becomes negative during the transient. It is can be seen that the presented converter topology is able to enlarge the operating duty ratio range and drastically improve converter performance during step-down load transients.

FIG. 10 illustrates a detailed view of the improved step-down transient with the negative Nx node voltage shown; channel 1 shows an output voltage (100 mV/div); channel 2 shows a Node Nx voltage (10V/div); Channel 3 shows a load transient control signal; the time scale is 50 μs/div.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A controller for a DC-DC power supply producing a positive DC output voltage, the controller producing switching signals during a heavy-to-light load transient response such that a negative input voltage is used by the DC-DC power supply; and
wherein the controller uses a duty cycle with a range that includes positive and negative values, positive duty cycle values indicating the portion of a cycle that a positive input voltage is provided rather than ground and negative duty cycle values indicating the portion of a cycle that the negative input voltage is provided rather than ground.

2. The controller of claim 1, wherein the negative input voltage is switched into an external LC circuit of the DC-DC power supply to quickly adjust the positive DC output to the heavy-to-light load transient.

3. The controller of claim 1, wherein the switching signals are sent to power switches to switch in a positive input voltage and ground during normal operation and to switch in the negative input voltage and ground during the heavy-to-light load transient response.

4. The controller of claim 1, wherein a capacitor is charged to provide the negative input voltage.

5. The controller of claim 1, wherein switching signals are used to control power switches to provide a positive input voltage, ground and the negative input voltage into an external LC circuit.

6. A DC-DC power supply that switches in a positive input voltage, ground and a negative input voltage into an LC circuit so as to produce a positive DC output voltage, the negative input voltage being used during a heavy-to-light load transient response.

7. The controller of claim 6, wherein the negative input voltage is switched into an external LC circuit of the DC-DC power supply to quickly adjust the positive DC output to the heavy-to-light load transient.

8. The DC-DC power supply of claim 6, including a controller to produce switching signals for power switches of the DC-DC power supply, the power switches switching in the positive input voltage input and ground during normal operation and the negative input voltage and ground during the heavy-to-light load transient response.

9. The DC-DC power supply of claim 6, further comprising a capacitor to provide the negative input voltage.

10. The DC-DC power supply of claim 9, wherein the positive input voltage is used to charge the capacitor to provide the negative input voltage.

11. A method for a DC-DC power supply comprising:
during normal operation, switching between a positive input voltage and ground so as to produce a positive DC output voltage; and
during a heavy-to-light load transient, switching between a negative input voltage and ground so as to adjust the positive DC output voltage; and
creating a duty cycle signal with a range that includes positive and negative values; and
wherein positive duty cycles values indicating the portion of a cycle that the positive input voltage is provided, rather than ground, and negative duty cycle values indicating the portion of a cycle that the negative input voltage is provided, rather than ground.

12. The method of claim 11, wherein the positive input voltage, ground and negative input voltage are switched into a LC circuit.

13. The method of claim 11, wherein switching signals are produced to select the positive input voltage, ground or negative input voltage.

14. The method of claim 11, wherein a capacitor is used to produce the negative input voltage.

* * * * *